(12) United States Patent
Karczewicz et al.

(10) Patent No.: US 8,565,314 B2
(45) Date of Patent: Oct. 22, 2013

(54) VARIABLE LENGTH CODING TABLE SELECTION BASED ON BLOCK TYPE STATISTICS FOR REFINEMENT COEFFICIENT CODING

(75) Inventors: Marta Karczewicz, San Diego, CA (US); Hyukjune Chung, San Diego, CA (US); Phoom Sagetong, Orange, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1517 days.

(21) Appl. No.: 11/868,017

(22) Filed: Oct. 5, 2007

(65) Prior Publication Data

US 2008/0089424 A1    Apr. 17, 2008

Related U.S. Application Data

(60) Provisional application No. 60/829,274, filed on Oct. 12, 2006, provisional application No. 60/883,741, filed on Jan. 5, 2007, provisional application No. 60/829,276, filed on Oct. 12, 2006.

(51) Int. Cl.
*H04N 1/417* (2006.01)

(52) U.S. Cl.
USPC .................................... 375/240.23

(58) Field of Classification Search
USPC .................................... 375/240.23
See application file for complete search history.

(56) References Cited

U.S. PATENT DOCUMENTS

| | | | |
|---|---|---|---|
| 5,400,075 A | 3/1995 | Savatier | |
| 5,640,420 A | 6/1997 | Jung | |
| 5,650,782 A | 7/1997 | Kim | |
| 5,793,897 A | 8/1998 | Jo et al. | |
| 5,835,145 A | 11/1998 | Ouyang et al. | |

(Continued)

FOREIGN PATENT DOCUMENTS

| | | |
|---|---|---|
| JP | 6225279 A | 8/1994 |
| JP | 7274171 A | 10/1995 |

(Continued)

OTHER PUBLICATIONS

Gary J. Sullivan et al: Joint Video Team (JVT) of ISO/IEC MPEG & 14-22, ITU-T VCEG (ISO/IEC JTC1/SC29/WG11 and 24,25 ITU-T SG16 Q .6), Mar. 31-Apr. 7, 2006.

(Continued)

*Primary Examiner* — Kibrom T Hailu
*Assistant Examiner* — Benjamin Lamont
(74) *Attorney, Agent, or Firm* — Brent Boyd

(57) ABSTRACT

This disclosure describes techniques for coding an enhancement layer in a scalable video coding (SVC) scheme. The techniques may be used in variable length coding of refinement coefficients of an enhancement layer of a SVC scheme. According to this disclosure, a method may comprise determining first statistics associated with a first type of video block. determining second statistics associated with a second type of video block, selecting a first variable length coding (VLC) table from a plurality of VLC tables to be used in coding the first type of video block based on the first statistics, selecting a second VLC table from the plurality of VLC tables to be used in coding the second type of video block based on the second statistics, coding video blocks of the first type based on the first VLC table, and coding video blocks of the second type based on the second VLC table.

16 Claims, 7 Drawing Sheets

(56) References Cited

U.S. PATENT DOCUMENTS

| | | | |
|---|---|---|---|
| 5,982,437 | A | 11/1999 | Okazaki et al. |
| 6,069,575 | A | 5/2000 | Kinouchi et al. |
| 6,144,322 | A | 11/2000 | Sato |
| 6,275,531 | B1 | 8/2001 | Li |
| 6,690,307 | B2 * | 2/2004 | Karczewicz ............ 341/67 |
| 6,700,933 | B1 | 3/2004 | Wu et al. |
| 6,919,828 | B2 | 7/2005 | Jeon et al. |
| 6,980,597 | B1 | 12/2005 | Ling |
| 7,348,903 | B2 | 3/2008 | Lee et al. |
| 7,369,706 | B2 | 5/2008 | Kurauchi |
| 7,664,176 | B2 | 2/2010 | Bao et al. |
| 7,912,510 | B2 * | 3/2011 | Park et al. ............ 455/567 |
| 2001/0033697 | A1 | 10/2001 | Shimada |
| 2003/0009722 | A1 | 1/2003 | Sugiyama et al. |
| 2003/0151529 | A1 | 8/2003 | Karczewicz |
| 2004/0005096 | A1 | 1/2004 | Kim et al. |
| 2004/0179606 | A1 | 9/2004 | Zhou et al. |
| 2005/0025246 | A1 | 2/2005 | Holcomb |
| 2006/0078049 | A1 | 4/2006 | Bao et al. |
| 2006/0153294 | A1 | 7/2006 | Wang et al. |
| 2006/0233255 | A1 | 10/2006 | Ridge et al. |
| 2006/0273939 | A1 | 12/2006 | Tanaka et al. |
| 2007/0080832 | A1 | 4/2007 | Yang et al. |
| 2007/0160126 | A1 | 7/2007 | Van Der Meer et al. |
| 2007/0224973 | A1 * | 9/2007 | Park et al. ............ 455/412.2 |
| 2008/0089420 | A1 | 4/2008 | Karczewicz |
| 2008/0089422 | A1 | 4/2008 | Karczewicz |
| 2008/0089423 | A1 | 4/2008 | Karczewicz |
| 2009/0129467 | A1 | 5/2009 | Li et al. |

FOREIGN PATENT DOCUMENTS

| | | |
|---|---|---|
| JP | 8046521 A | 2/1996 |
| JP | 08280032 | 10/1996 |
| JP | 11242573 A | 9/1999 |
| JP | 11252573 A | 9/1999 |
| JP | 2001094982 | 4/2001 |
| JP | 2002058028 A | 2/2002 |
| JP | 2008507191 A | 3/2008 |
| JP | 2009506710 A | 2/2009 |
| KR | 20010105629 | 11/2001 |
| KR | 20030081772 | 10/2003 |
| KR | 100606588 | 8/2006 |
| KR | 20070062393 A | 6/2007 |
| KR | 1032277 | 4/2011 |
| RU | 2117388 | 8/1998 |
| RU | 2119727 | 9/1998 |
| RU | 2004125588 | 1/2006 |
| RU | 2005113308 | 1/2006 |
| RU | 2335845 | 10/2008 |
| TW | 200612755 | 4/2006 |
| TW | 200627963 | 8/2006 |
| WO | 9517073 A1 | 6/1995 |
| WO | WO03053066 A1 | 6/2003 |
| WO | WO2005094081 | 10/2005 |
| WO | WO2006067712 A1 | 6/2006 |
| WO | WO2006075235 A1 | 7/2006 |

OTHER PUBLICATIONS

Jian Zhou et al, FGS enhancement layer truncation with minimized intra-frame quality variation, Multimedia and Expo, 2003. Proceedings. 2003 International Conference on Jul. 6-9, 2003, Piscataway, vol. 2, pp. 361-364.

Report of 78th meeting, International organization of standardization organization international de normalization ISO/IEC JTC 1/sc29/WG 11 coding of moving pictures and audio, p. 139, Oct. 2006.

Ridge J. et al., Improvement of FGS refinement, Joint Video Team (JVT) of ISO/IEC MPEG&ITU-T VCEG, JVT-V077, Jan. 13-19, 2007.

Shima M: "CE1: Complexity reduction for adaptive VLC", Geneva: ISO, CH. Jan. 10, 2006, XP030006289.

International Preliminary Report on Patentability—PCT/US08/050261, International Search Authority—European Patent Office—Mar. 11, 2009.

Macnicol, James et al., "Scalable Video Coding by Stream Morphing," IEEE Transactions on Circuits and Systems for Video Technology, vol. 15, No. 2, Feb. 2005, pp. 306-319.

Karczewicz, M., et al., "Improved Refinement Coefficients Coding," Joint Video Team (JVT) of ISO/IEC MPEG & ITU-T VCEG (ISO/IEC JTC1/SC29/WG11 and ITU-T SG16 Q.6), 21st Meeting: Hangzhou, China Oct. 20-27, 2006, No. JVT-U132, Oct. 20, 2006, XP030006778.

Ling, et al., "Bitplane Coding of DCT Coefficients for Image and Video Compression," Proceedings of the SPIE, SPIE, Bellingham, WA, vol. 3653, No. 1-2, 1998, pp. 500-508.

Marpe, et al., "Improved CABAC for Progressive Refinement Slices," Joint Video Team (JVT) of ISO/IEC MPEG & ITU-T VCEG (ISO/IEC JTC1/SC29/WG11 and ITU-T SG16 Q.6, 20th Meeting: Klagenfurt, Austria, Jul. 15-21, 2006, No. JVT-T077.

Ridge, J., et al., "CE8: VLCs for SVC," Joint Video Team (JVT) of ISO/IEC MPEG & ITU-T VCEG (ISO/IEC JTC1/SC29/WG11 and ITU-T SG16 Q.6, 17th Meeting: Nice, France, Oct. 14-21, 2005 No. JVT-Q040-L, Oct. 14, 2005, XP030006203.

Ridge, J., et al., "Variable Length Codes for SVC," Joint Video Team (JVT) of ISO/IEC MPEG & ITU-T VCEG (ISO/IEC JTC1/SC29/WG11 and ITU-T SG16 Q.6), 16th Meeting: Poznan, Poland, Jul. 24-29, 2005, No. JVT-P056, XP0301006095.

Shima, M. "Modified VLC for Refinement Pass," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S031, XP030006410.

Wiegand, et al., "Joint Draft 6: Scalable Video Coding," JVT-S 201, Apr. 2006, Geneva.

Wiegand, et al., "Joint Draft 9 of SVC Amendment," JVT-V 201, Jan. 2007, Marrakech, Morocco.

Ye, Y., et al., "Improvements to FGS Layer Variable Length Coder," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S066, XP030006445.

ITU-T Recommendation H.223, Multiplexing Protocol for Low Bit Rate Multimedia Communication, (Jul. 2001).

ITU-T Recommendation H.263 Video Coding for Low Bit Rate Communication (Jan. 2005).

ITU-T Recommendation H.264, Advanced Video Coding for Generic Audiovisual Services, Mar. 2005.

"Forward Link Only Air Interface Specification for Terrestrial Mobile Multimedia Multicast," TIA-1099, Aug. 2006.

International Search Report—PCT/US08/050261, International Search Authority—European Patent Office—Apr. 29, 2008.

Written Opinion—PCT/US08/050261, International Search Authority—European Patent Office, Apr. 29, 2008.

Nevdiaev L.M., Telecommunications Technology, English-Russian Explanatory Dictionary, Communications and Business, Moscow, 2002, pp. 103,136.

Taiwan Search Report—TW096138307—TIPO—Apr. 19, 2011.

Taiwan Search Report—TW09710823—TIPO—Jun. 5, 2011.

Xianglin Wang et al, CE7 Report, Multiple FGS layer coding for low-delay applications, Joint Video Team (JVT) of ISO/IEC MPEG & ITU-T VCEG, JVT-R077, Jan. 14, 2006.

Yen-Kuang Chen et al, Implementation of Real-Time MPEG-4 FGS Encoder, Advances in Multimedia Information Processing—PCM 2002, Springer Berlin/Heidelberg, 2002, pp. 839-846.

Bae-Keun Lee and woo-Jin Han,VLC for FGS layer in 8×8 transform, Joint Video Team (JVT) of ISO/IEC MPEG & ITU-T VCEG (ISO/IEC JTC1/SC29/WG11 and ITU-T SG16 Q.6) 17th Meeting: Nice, FR, Document: JVT-Q057, ITU-T, Oct. 14, 2005.

(56) References Cited

OTHER PUBLICATIONS

Bae-Keun Lee, CE1: Improvement CAVLC for SVC, Joint Video Team (JVT) of ISO/IEC MPEG & ITU-T VCEG (ISO/IEC JTC1/SC29/WG11 and ITU-T SG16 Q.6) 17th Meeting: Nice, FR, Document: JVT-Q301, ITU-T, Oct. 21, 2005.

Julien Reichel et al., Draft of Joint Scalable Video Model JSVM-4 Annex G, Joint Video Team(JVT) of ISO/IEC MPEG & ITU-T VCEG (ISO/IEC JTC1/SC29/WG11 and ITU-T SG16 Q.6) 17th Meeting: Nice, France, Document: JVT-Q201, Filename: JVT-Q202-AnnexG.doc, ITU-T, Nov. 18, 2005.

Karczewicz M., "Report of core experiment on improved refinement coefficients coding (CE1)", JVT-V095, Joint Video Team (JVT) of ISO/IEC MPEG & ITU-T VCEG, 22nd Meeting: Marrakech, Jan. 13-19, 2007, p. 1 para.3-p. 2 para.7.

Taiwan Search Report—TW097100640—TIPO—Sep. 13, 2011.

* cited by examiner

US 8,565,314 B2

VARIABLE LENGTH CODING TABLE SELECTION BASED ON BLOCK TYPE STATISTICS FOR REFINEMENT COEFFICIENT CODING

This application claims the benefit of the following U.S. Provisional Applications, the entire content each of which is incorporated herein by reference:

U.S. Provisional Application No. 60,829,274, filed Oct. 12, 2006,

U.S. Provisional Application No. 60,883,741, filed Jan. 5, 2007, and

U.S. Provisional Application No. 60/829,276, filed Oct. 12, 2006.

TECHNICAL FIELD

This disclosure relates to digital video coding and, more particularly, variable length coding (VLC) of transform coefficients in enhancement layers of a scalable video coding (SVC) scheme.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

In video coding, video compression often includes spatial prediction, motion estimation and motion compensation. Intra-coding relies on spatial prediction to reduce or remove spatial redundancy between video blocks within a given video frame. Inter-coding relies on temporal prediction to reduce or remove temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vectors to generate prediction video blocks from a reference frame. After motion compensation, a residual video block is formed by subtracting the prediction video block from the original video block to be coded.

The video encoder usually applies transform, quantization and transform coefficient coding processes to further reduce the bit rate associated with communication of the residual block. Coding of the transform coefficients of the residual blocks may involve the application of variable length codes to further compress coefficients produced by the transform and quantization operations. For example, a variable length coding (VLC) table may be used to match different sets of coefficients to variable length codewords in a manner that promotes coding efficiency. Different VLC tables may be used for different video content. A video decoder performs inverse VLC operations to reconstruct the coefficients, and then inverse transforms the coefficients to reconstruct the video information. The video decoder can decode the video information based on the motion information and residual information associated with video blocks.

Some video coding makes use of scalable techniques. For example, scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. The base layer may be transmitted in a manner that is more reliable than the transmission of enhancement layers. Enhancement layers may add spatial resolution to frames of the base layer, or may add additional frames to increase the overall frame rate. In one example, the most reliable portions of a modulated signal may be used to transmit the base layer, while less reliable portions of the modulated signal may be used to transmit the enhancement layers. Enhancement layers may define different types of coefficients, referred to as significant coefficients and refinement coefficients.

SUMMARY

In general, this disclosure describes techniques for coding an enhancement layer in a scalable video coding (SVC) scheme. The techniques provide for the selection of variable length coding (VLC) tables during the encoding and decoding processes. The techniques may be used in coding blocks of transform coefficients, and may be particularly useful in VLC of refinement coefficients of blocks of an enhancement layer of an SVC scheme. Refinement coefficients refer to coefficients of an enhancement layer for which the corresponding coefficients of a previous layer in the SVC scheme had non-zero values. VLC of refinement coefficients may be performed separately from VLC of significant coefficients, which refer to coefficients of the enhancement layer for which the corresponding coefficients of a previous layer in the SVC scheme had values of zero.

According to the techniques of this disclosure, VLC tables are selected for different types of video blocks, e.g., intra blocks and inter blocks. The tables may be selected once for every frame of video information, or could be selected once for other types of coding units (such as once per slice of video information or once per FGS layer of a frame). The VLC tables for different types of video blocks can be selected based on statistics associated with previously coded blocks. For example, a VLC table for intra blocks may be selected based on statistics associated with previously coded intra blocks. Similarly, a VLC table for inter blocks may be selected based on statistics associated with previously coded inter blocks. In one example, the statistics for each type of video block may comprise a ratio of the number of refinement coefficients in previously coded blocks that had a same sign value relative to the number of refinement coefficients in previously coded blocks that had an inverted sign value. Based on this ratio, VLC tables may be selected for coding the refinement coefficients associated with blocks of a given frame, and when the next frame is encounter, the ratio can be calculated again to facilitate VLC table selections for that frame.

In one example, this disclosure provides a method of coding an enhancement layer of an SVC scheme, the method comprising determining first statistics associated with a first type of video block, determining second statistics associated with a second type of video block, selecting a VLC table from a plurality of VLC tables to be used in coding the first type of video block based on the first statistics, selecting a second VLC table from the plurality of VLC tables to be used in coding the second type of video block based on the second statistics, coding video blocks of the first type based on the first VLC table, and coding video blocks of the second type based on the second VLC table.

In another example, this disclosure provides a device that codes an enhancement layer of an SVC scheme, the device comprising a statistics module that determines first statistics associated with a first type of video block and determines second statistics associated with a second type of video block, a table selection module that selects a first VLC table from a plurality of VLC tables to be used in coding the first type of video block based on the first statistics and selects a second VLC table from the plurality of VLC tables to be used in coding the second type of video block based on the second statistics, and a coding module that codes video blocks of the first type based on the first VLC table and codes video blocks of the second type based on the second VLC table.

In another example, this disclosure provides a device that codes an enhancement layer of an SVC scheme, the device comprising means for determining statistics that determines first statistics associated with a first type of video block and determines second statistics associated with a second type of video block, means for selecting that selects a first VLC table from a plurality of VLC tables to be used in coding the first type of video block based on the first statistics and selects a second VLC table from the plurality of VLC tables to be used in coding the second type of video block based on the second statistics, and means for coding that codes video blocks of the first type based on the first VLC table, and code video blocks of the second type based on the second VLC table.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to code an enhancement layer of an SVC scheme, wherein the instructions cause the device to determine first statistics associated with a first type of video block, determine second statistics associated with a second type of video block, select a first VLC table from a plurality of VLC tables to be used in coding the first type of video block based on the first statistics, select a second VLC table from the plurality of VLC tables to be used in coding the second type of video block based on the second statistics, code video blocks of the first type based on the first VLC table, and code video blocks of the second type based on the second VLC table.

In some cases, the computer-readable medium may form part of a computer program product, which may be sold to manufacturers and/or used in a video coding device. The computer program product may include the computer readable medium, and in some cases, may also include packaging materials.

In other cases, this disclosure may be directed to a circuit, such as an integrated circuit, chipset, application specific integrated circuit (ASIC), field programmable gate array (FPGA), logic, or various combinations thereof configured to perform one or more of the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes techniques for coding an enhancement layer in a scalable video coding (SVC) scheme. The techniques provide for the selection of variable length coding (VLC) tables at an encoder and at a decoder. That is to say, the VLC table selection techniques are reciprocal in that VLC table selection is performed at the encoder to encode information and at the decoder to decode the information. The techniques may be used in coding transform coefficients, and are particularly useful in variable length coding of refinement coefficients of an enhancement layer of a SVC scheme. Refinement coefficients refer to coefficients of an enhancement layer for which the corresponding coefficients of a previous layer in the SVC scheme had non-zero values. In contrast, significant coefficients refer to coefficients of an enhancement layer for which the corresponding coefficients of a previous layer in the SVC scheme had values of zero. Variable length coding of refinement coefficients may be performed separately from variable length coding of significant coefficients.

According to the techniques of this disclosure, VLC tables are selected for different types of video blocks, e.g., intra blocks and inter blocks. The tables may be selected once per coded unit, e.g., once per frame, once per slice of video information, once per FGS layer of a frame. The VLC tables for different types of video blocks can be selected based on statistics associated with previously coded blocks. For example, a VLC table for intra blocks may be selected based on statistics associated with previously coded intra blocks, and a VLC table for inter blocks may be selected based on statistics associated with previously coded inter blocks.

In one example, the statistics for each type of video block may comprise a ratio of the number of refinement coefficients in previously coded blocks of that block type that had a same sign value relative to the number of refinement coefficients in previously coded blocks of that block type that had an inverted sign value. Based on the ratio for each type of block (intra and inter), a first VLC table may be selected for coding the refinement coefficients associated with intra blocks of a given frame, and a second VLC table may be selected for coding the refinement coefficients associated with inter blocks of the given frame. When the next frame is encountered, the ratios can be calculated again to facilitate VLC table selections for that frame.

Figure 1:
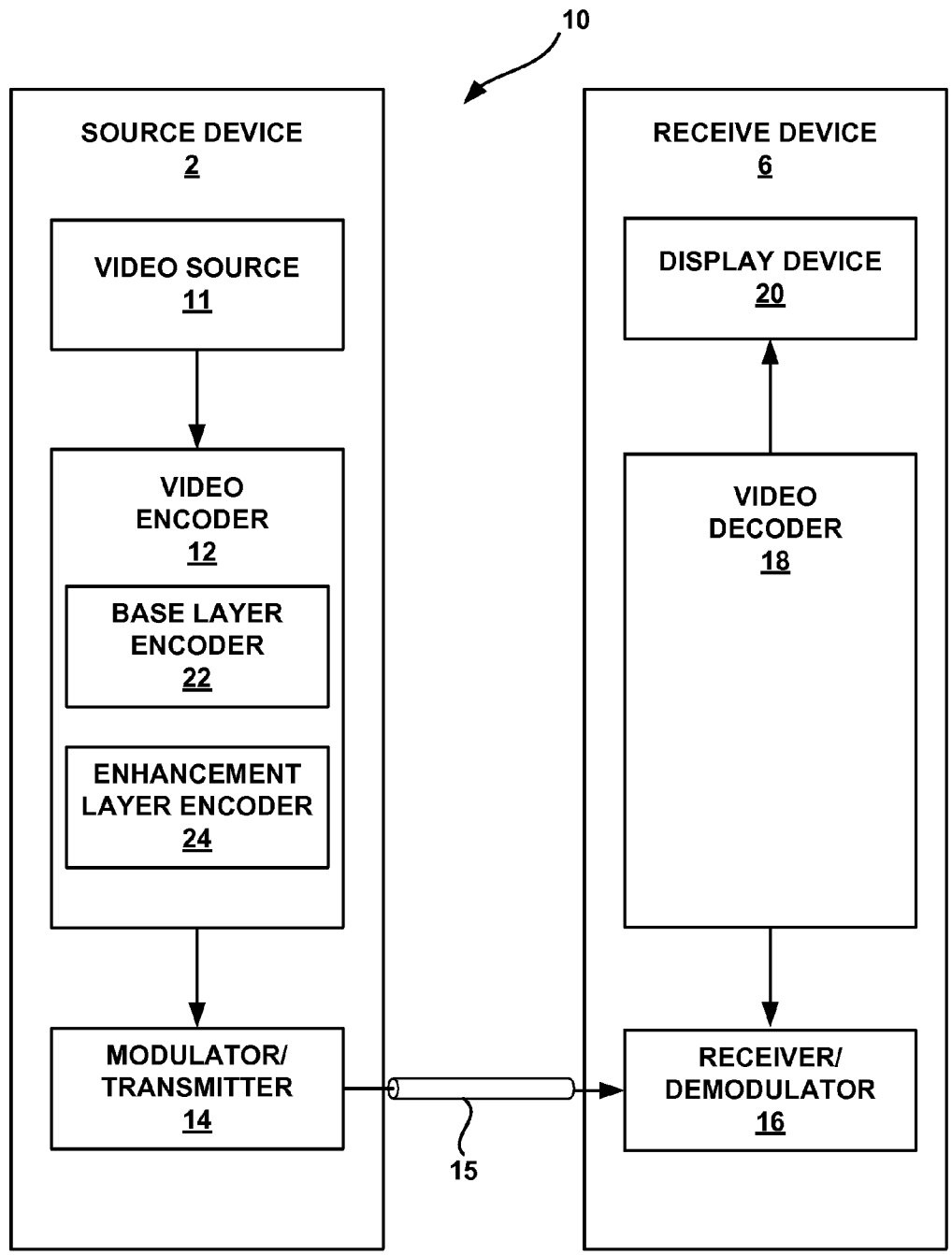
FIG. 1 is an exemplary block diagram illustrating a video encoding and decoding system.

FIG. 1 is a block diagram illustrating a video encoding and decoding system 10. As shown in FIG. 1, system 10 includes a source device 2 that transmits encoded video to a receive device 6 via a communication channel 15. Source device 2 may include a video source 11, video encoder 12 and a modulator/transmitter 14. Receive device 6 may include a receiver/demodulator 16, video decoder 18, and display device 20. System 10 may be configured to apply techniques for VLC of video information associated with an enhancement layer in an SVC scheme.

SVC refers to video coding in which a base layer and one or more scalable enhancement layers are used. For SVC, a base layer typically carries video data with a base level of quality. One or more enhancement layers carry additional video data to support higher spatial, temporal and/or signal-to-noise SNR levels. Enhancement layers may be defined relative to the previously encoded layer. Enhancement layers define at least two different types of coefficients, referred to as significant coefficients and refinement coefficients. Refinement coefficients may define values relative to the corresponding values of the previously encoded layer. Frames of enhancement layers sometimes only include a portion of the total number of video blocks in the base layer or previous enhancement layer, e.g., only those blocks for which enhancement is performed.

Significant coefficients refer to coefficients for which corresponding coefficients in the previous layer had values of zero. Refinement coefficients refer to coefficients for which corresponding coefficients in the previous layer had non-zero values in the previous layer. Variable length coding of enhancement layers typically involves a two-pass approach. A first pass is performed to variable length code the significant coefficients, and another pass is performed to variable length code the refinement coefficients. The techniques of this disclosure are particularly useful for the variable length coding of refinement coefficients, although this disclosure is not necessarily limited in this respect.

According to the techniques of this disclosure, different VLC tables are selected for different types of video blocks. For example, a first VLC table may be selected for coding refinement coefficients of intra blocks and a second VLC table may be selected for coding refinement coefficients of inter blocks. Intra blocks refer to blocks that are coded based on blocks within that given coded unit. Inter blocks refer to blocks that are coded based on blocks of another coded unit.

The VLC table selections may be based on statistics associated with previously coded blocks. For example, a VLC table for intra blocks may be selected based on statistics associated with previously coded intra blocks, and a VLC table for inter blocks may be selected based on statistics associated with previously coded inter blocks. VLC tables may be selected once per coded unit, such as once per frame of video information, once per slice of video information, or once per FGS layer. FGS stands for Fine Granularity signal-to-noise Scalability, and is explained in greater detail below.

The statistics for each type of video block may comprise a ratio of the number of refinement coefficients in previously coded blocks that had a same sign value relative to the number of refinement coefficients in previously coded blocks that had an inverted sign value. Based on a ratio for each block type, i.e., the ratio for intra blocks and the ratio for inter blocks, first and second VLC tables may be selected for coding the refinement coefficients associated with intra blocks and inter blocks of the given frame (or other coded unit), respectively. When the next frame (or other coded unit) is encountered, the ratios can be calculated again to facilitate updated VLC table selections.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 2 to receive device 6.

Source device 2 generates coded video data for transmission to receive device 6. In some cases, however, devices 2, 6 may operate in a substantially symmetrical manner. For example, each of devices 2, 6 may include video encoding and decoding components. Hence, system 10 may support one-way or two-way video transmission between video devices 2, 6, e.g., for video streaming, video broadcasting, or video telephony.

Video source 11 of source device 2 may include a video capture device, such as a video camera, a video archive containing previously captured video, or a video feed from a video content provider. As a further alternative, video source 11 may generate computer graphics-based data as the source video, or a combination of live video and computer-generated video. In some cases, if video source 11 is a video camera, source device 2 and receive device 6 may form so-called camera phones or video phones. In each case, the captured, pre-captured or computer-generated video may be encoded by video encoder 12 for transmission from video source device 2 to video decoder 18 of video receive device 6 via modulator/transmitter 14, communication channel 15 and receiver/demodulator 16. The video encoding and decoding processes may implement the VLC table selection techniques described herein to improve the processes. Display device 20 displays the decoded video data to a user, and may comprise any of a variety of display devices such as a cathode ray tube, a liquid crystal display (LCD), a plasma display, an organic light emitting diode (OLED) display, or another type of display device.

Video encoder 12 and video decoder 18 may be configured to support SVC for spatial, temporal and/or signal-to-noise ratio (SNR) scalability. In some aspects, video encoder 12 and video decoder 18 may be configured to support fine granularity SNR scalability (FGS) coding for SVC. Encoder 12 and decoder 18 may support various degrees of scalability by supporting encoding, transmission and decoding of a base layer and one or more scalable enhancement layers. Again, for scalable video coding, a base layer carries video data with a baseline level of quality. One or more enhancement layers carry additional data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers.

In order to support SVC, video encoder 12 may include a base layer encoder 22 and one or more enhancement layer encoders 24 to perform encoding of a base layer and one or more enhancement layers, respectively. The techniques of this disclosure, which involve VLC table selection, are applicable to the coding of video blocks of enhancement layers in SVC. More specifically, the techniques of this disclosure are applicable to VLC of refinement coefficients of video blocks of enhancement layers, although this disclosure is not necessarily limited in this respect.

Video decoder 18 may include a combined base/enhancement decoder that decodes the video blocks associated with both base and enhancement layers. Vide decoder 18 may decode the video blocks associated with both base and enhancement layers, and combine the decoded video to reconstruct the frames of a video sequence. Display device 20 receives the decoded video sequence, and presents the video sequence to a user.

Video encoder 12 and video decoder 18 may operate according to a video compression standard, such as MPEG-2, MPEG-4, ITU-T H.263, or ITU-T H.264/MPEG-4, Part 10, Advanced Video Coding (AVC). Although not shown in FIG. 1, in some aspects, video encoder 12 and video decoder 18 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on an SVC extension to H.264/MPEG-4 AVC. The specification of the evolving SVC extension is in the form of a Joint Draft (JD). The Joint Scalable Video Model (JSVM) created by the JVT implements tools for use in scalable video, which may be used within system 10 for various coding tasks described in this disclosure. Detailed information concerning Fine Granularity SNR Scalability (FGS) coding can be found in the Joint Draft documents, and particularly in Joint Draft 6 (SVC JD6), Thomas Wiegand, Gary Sullivan, Julien Reichel, Heiko Schwarz, and Mathias Wien, "Joint Draft 6: Scalable Video Coding," JVT-S 201, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, January 2007, Marrakech, Morocco.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast—terrestrial), or DMB (digital media broadcast). Hence, source device 2 may be a mobile wireless terminal, a video streaming server, or a video broadcast server. However, techniques described in this disclosure are not limited to any particular type of broadcast, multicast, or point-to-point system. In the case of broadcast, source device 2 may broadcast several channels of video data to multiple receive devices, each of which may be similar to receive device 6 of FIG. 1.

Video encoder 12 and video decoder 18 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 12 and video decoder 18 may be included in one or more encoders or decoders, either of which may be integrated as part of a combined encoder/decoder (CODEC) in a respective mobile device, subscriber device, broadcast device, server, or the like. In addition, source device 2 and receive device 6 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 14 of source device 2 and receiver/demodulator 16 of receive device 6 in FIG. 1.

A video sequence includes a series of video frames. Video encoder 12 operates on blocks of pixels (or blocks of transformed coefficients) within individual video frames in order to encode the video data. The video blocks may have fixed or varying sizes, and may differ in size according to a specified coding standard. In some cases, each video frame is a coded unit, while in other cases, each video frame may be broken includes a series of slices that form coded units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. As noted, each slice may be an independently decodable unit of a video frame.

Following intra- or inter-based predictive coding, additional coding techniques may be applied to the transmitted bitstream. These additional coding techniques may include transformation techniques (such as the 4×4 or 8×8 integer transform used in H.264/AVC or a discrete cosine transformation DCT), and variable length coding. Blocks of transformation coefficients may be referred to as video blocks. In other words, the term "video block" refers to a block of video data regardless of the domain of the information. Thus, video blocks can be in a pixel domain or a transformed coefficient domain. The application of VLC table selection and VLC coding will be described generally in this disclosure with respect to blocks of transform coefficients.

This disclosure provides techniques for variable length coding of refinement coefficients. Again, refinement coefficients refer to coefficients that had non-zero values in the previous layer, whereas significant coefficients refer to coefficients that had values of zero in the previous layer. According to this disclosure, encoder 12 and decoder 18 select different VLC tables for different types of video blocks. For example, encoder 12 and decoder 18 may select a first VLC for coding refinement coefficients of intra blocks and may select a second VLC table for coding refinement coefficients of inter blocks. The VLC table selections by encoder 12 and decoder 18 may be based on statistics associated with previously coded blocks. For example, a VLC table for intra blocks may be selected based on statistics associated with previously coded intra blocks, and a VLC table for inter blocks may be selected based on statistics associated with previously coded inter blocks. Thus, encoder 12 and decoder 18 may perform reciprocal methods that code an enhancement layer in an SVC scheme. As used herein, the term coding generally refers to at least a portion of either the encoding or decoding processes. Video encoder 12 encodes the data, while video decoder 18 decodes the data.

The VLC tables themselves may assign codewords to different sets of transform coefficients. Sets of zero value coefficients may be represented by run lengths of zeros, and the tables may assign more probable run lengths to shorter VLC codes. Similarly, VLC tables may assign less probable run lengths to longer VLC codes. Hence, selection of codes from the VLC tables may improve coding efficiency. Alternatively, different patterns of coefficients, such as coded block patterns, may be assigned different variable length codewords, with more probable patterns being assigned the shorter codewords and less probable patterns being assigned the longer codewords.

The formation of the VLC tables themselves could also be based on prior coding statistics, but in most cases, static VLC tables are used. In the case of static VLC tables, encoder 12 and decoder 18 simply select an appropriate VLC table from a set of possible tables for coding the refinement coefficients of intra blocks and select another appropriate VLC table from the set of possible tables for coding the refinement coefficients of inter blocks. Regardless of whether the VLC tables are static or formed dynamically, updates to the VLC tables could be made, as desired.

Figure 2:
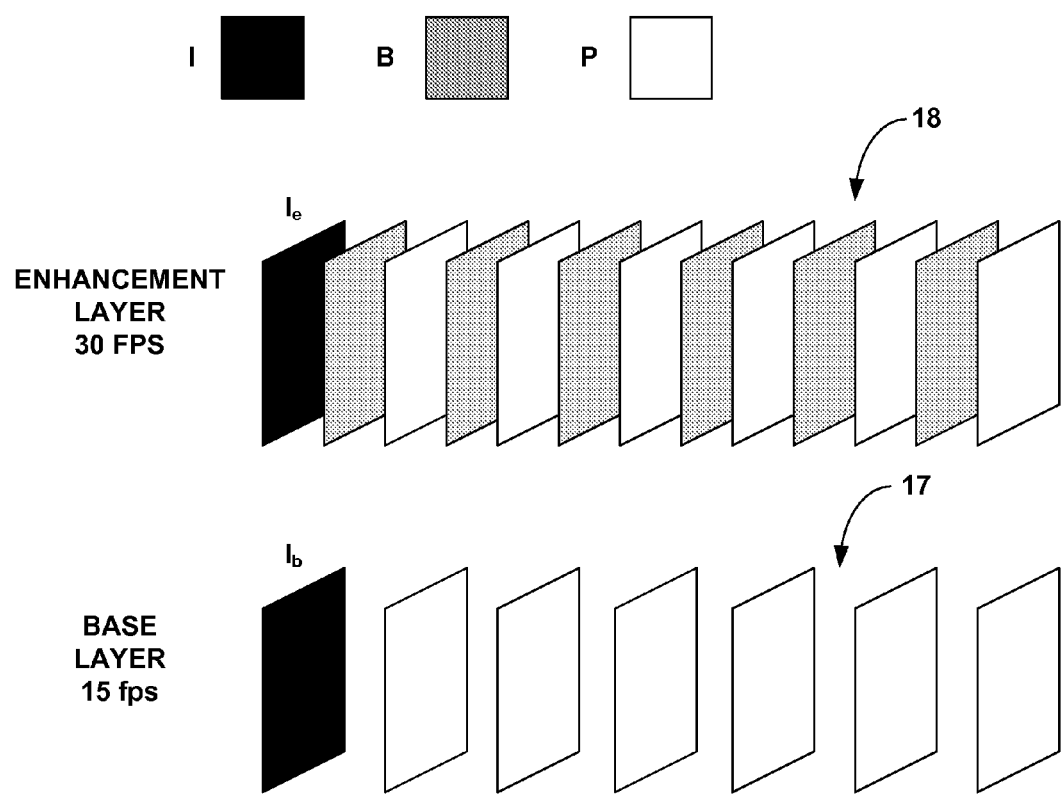
FIG. 2 is a conceptual diagram illustrating video frames of a base layer and an enhancement layer of a scalable video bitstream.

FIG. 2 is a diagram illustrating video frames within a base layer 17 and enhancement layer 18 of a scalable video bitstream. As noted above, the techniques of this disclosure are applicable to the coding of data of enhancement layers. Base layer 17 may comprise a bitstream containing encoded video data that represents the first level of spatial, temporal, or SNR scalability. Enhancement layer 18 may comprise a bitstream containing encoded video data that represents a second level of spatial, temporal and/or SNR scalability. Although a single enhancement layer is shown, several layers of enhancement may be used in some cases. The enhancement layer bitstream may be decodable only in conjunction with the base layer (or previous enhancement layer if multiple enhancement layers exist). Enhancement layer 18 contains references to the decoded video data in base layer 17. Such references may be used either in the transform domain or pixel domain to generate the final decoded video data.

Base layer 17 and enhancement layer 18 may contain intra (I), inter (P), and bi-directional (B) frames. Intra frames may include all intra-coded video blocks. I and P frames may include at least some inter-coded video blocks (inter blocks), but may also include some intra-coded blocks (intra blocks). The different frames of enhancement layer 17 need not include all of the video blocks in base layer 17. The P frames in enhancement layer 18 rely on references to P frames in base layer 17. By decoding frames in enhancement layer 18 and base layer 17, a video decoder is able to increase the video quality of the decoded video. For example, base layer 17 may include video encoded at a minimum frame rate of e.g., 15 frames per second, whereas enhancement layer 18 may include video encoded at a higher frame rate of e.g., 30 frames per second. To support encoding at different quality levels, base layer 17 and enhancement layer 18 may be encoded with a higher quantization parameter (QP) and lower QP, respectively. Moreover, base layer 17 may be transmitted in a manner that is more reliable than the transmission of enhancement layer 18. As an example, the most reliable portions of a modulated signal may be used to transmit base layer 17, while less reliable portions of the modulated signal may be used to transmit enhancement layer 18. The illustration of FIG. 2 is merely exemplary, as base and enhancement layers could be defined in many different ways.

Figure 3:
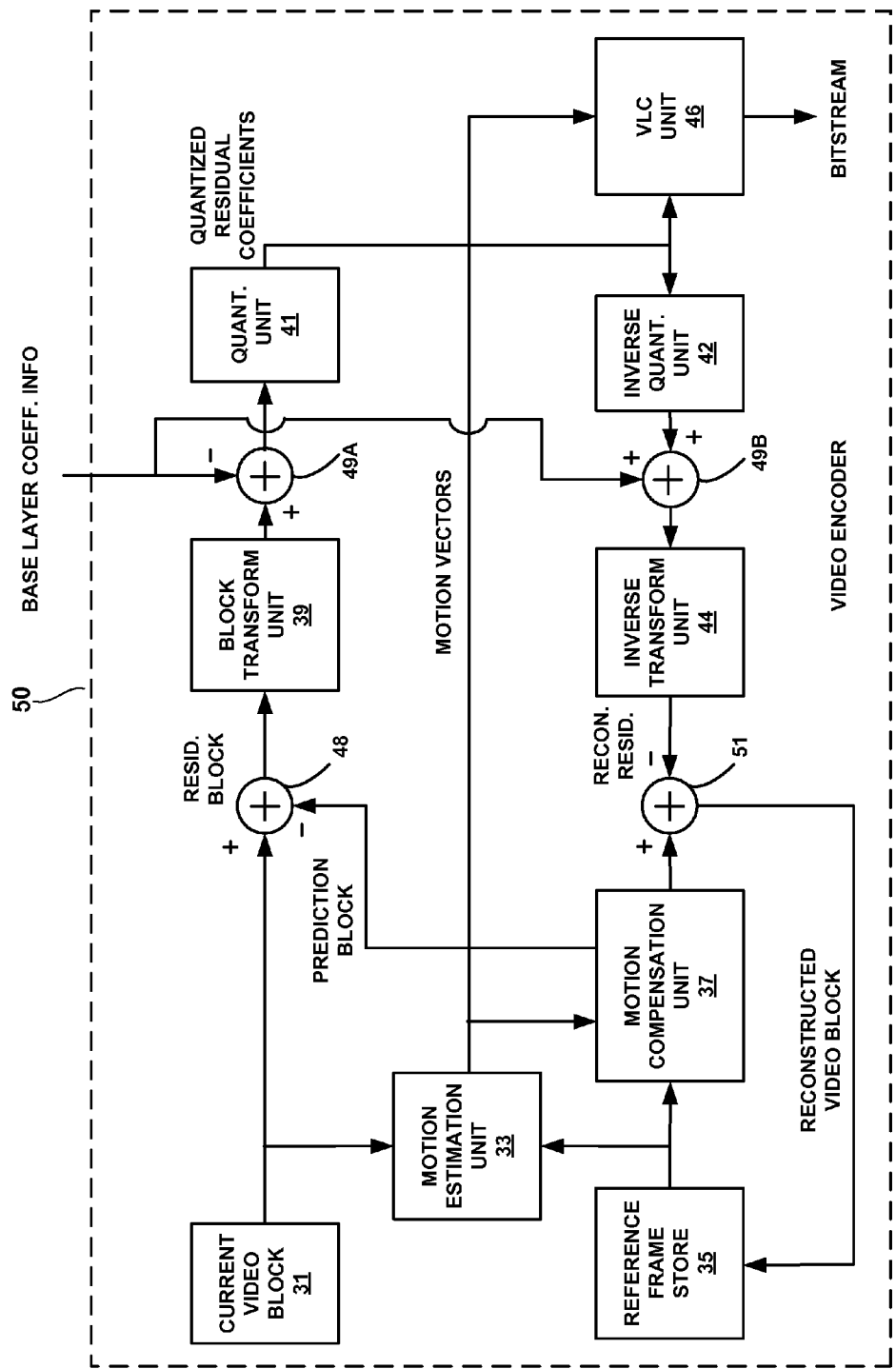
FIG. 3 is a block diagram illustrating an example of a video encoder consistent with this disclosure.

FIG. 3 is a block diagram illustrating an example of a video encoder 50 that includes a VLC unit 46 to encode data consistent with this disclosure. Video encoder 50 of FIG. 3 may correspond to enhancement layer encoder 24 of source device 2 in FIG. 1. That is to say, base layer encoding components are not illustrated in FIG. 3 for simplicity. Therefore, video encoder 50 may be considered an enhancement layer encoder. Alternatively, the illustrated components of video encoder 50 could also be implemented in combination with base layer encoding modules or units, e.g., in a pyramid encoder design that supports scalable video coding of the base layer and the enhancement layer.

Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames. For intra-coding, spatial prediction is used to identify other blocks within a frame that closely match the block being coded. Intra-coding, spatial prediction components, are not illustrated in FIG. 3.

As shown in FIG. 3, video encoder 50 receives a current video block 31 (e.g., an enhancement layer video block) within a video frame to be encoded. In the example of FIG. 3, video encoder 50 includes motion estimation unit 33, reference frame store 35, motion compensation unit 37, block transform unit 39, quantization unit 41, inverse quantization unit 42, inverse transform unit 44 and VLC unit 46. A deblocking filter (not shown) may also be included to filter block boundaries to remove blockiness artifacts. Video encoder 50 also includes summer 48 and summer 51. FIG. 3 illustrates the temporal prediction components of video encoder 50 for inter-coding of video blocks. Although not shown in FIG. 3 for ease of illustration, video encoder 50 also may include spatial prediction components for intra-coding of some video blocks. Spatial prediction components, however, are usually used only for base layer coding.

Motion estimation unit 33 compares video block 31 to blocks in one or more adjacent video frames to generate one or more motion vectors. The adjacent frame or frames may be retrieved from reference frame store 35, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 33 identifies a block in an adjacent frame that most closely matches the current video block 31, e.g., based on a rate distortion model, and determines a displacement between the blocks. On this basis, motion estimation unit 33 produces a motion vector (MV) (or multiple MV's in the case of bidirectional prediction) that indicates the magnitude and trajectory of the displacement between current video block 31 and a predictive block used to code current video block 31.

Motion vectors may have half- or quarter-pixel precision, or even finer precision, allowing video encoder 50 to track motion with higher precision than integer pixel locations and obtain a better prediction block. When motion vectors with fractional pixel values are used, interpolation operations are carried out in motion compensation unit 37. Motion estimation unit 33 may identify the best motion vector for a video block using a rate-distortion model. Using the resulting motion vector, motion compensation unit 37 forms a prediction video block by motion compensation.

Video encoder 50 forms a residual video block by subtracting the prediction video block produced by motion compensation unit 37 from the original, current video block 31 at summer 48. Block transform unit 39 applies a transform, such as a discrete cosine transform (DCT), to the residual block, producing residual transform block coefficients. Quantization unit 41 quantizes the residual transform block coefficients to further reduce bit rate. Summer 49A receives base layer coefficient information, e.g., from a base layer encoder (not show) and is positioned between block transform unit 39 and quantization unit 41 to supply this base layer coefficient information into the enhancement layer coding. In particular, summer 49A subtracts the base layer coefficient information from the output of block transform unit 39. In a similar fashion, summer 49B, which is positioned between inverse transform unit 44 and inverse quantization unit 42, also receives the base layer coefficient information from the base layer encoder (not shown). Summer 49B adds the base layer coefficient information back to the output of inverse quantization unit 42.

Spatial prediction coding operates very similar to temporal prediction coding. However, whereas temporal prediction coding relies on blocks of adjacent frames (or other coded units) to perform the coding, spatial prediction relies on blocks of within a common frame (other coded unit) to perform the coding. Spatial prediction coding codes intra blocks, while temporal prediction coding codes inter blocks. Again, the spatial prediction components are not shown in FIG. 3 for simplicity.

VLC unit 46 codes the quantized transform coefficients according a variable length coding methodology to even further reduce the bit rate of transmitted information. In particular, VLC unit 46 applies techniques of this disclosure to code the refinement coefficients of an enhancement layer. VLC unit 46 may include VLC tables that map sets of coefficients to variable length codewords.

VLC table selection by VLC unit 46 is performed based on information gathered for previously coded frames. Moreover, VLC tables are selected for different types of video blocks, e.g., intra blocks and inter blocks. VLC unit 46 may select VLC tables once per coded unit, e.g., once per frame, once per slice of video information, or once per FGS layer of a frame. The VLC tables for different types of video blocks can be selected based on statistics associated with previously coded blocks. For example, VLC unit 46 may select a VLC table for intra blocks based on statistics associated with previously coded intra blocks, and VLC unit 46 may select a VLC table for inter blocks based on statistics associated with previously coded inter blocks. In this case, the statistics associated with previously coded blocks may comprise the average number of non-zero coefficients with such previously coded blocks.

Following the variable length coding, the encoded video may be transmitted to another device. In addition, inverse quantization unit 42 and inverse transform unit 44 apply inverse quantization and inverse transformation, respectively, to reconstruct the residual block. Summer 51 adds the reconstructed residual block to the motion compensated prediction block produced by motion compensation unit 37 to produce a reconstructed video block for storage in reference frame store 35. The reconstructed video block is used by motion estimation unit 33 and motion compensation unit 37 to encode a block in a subsequent video frame.

Figure 4:
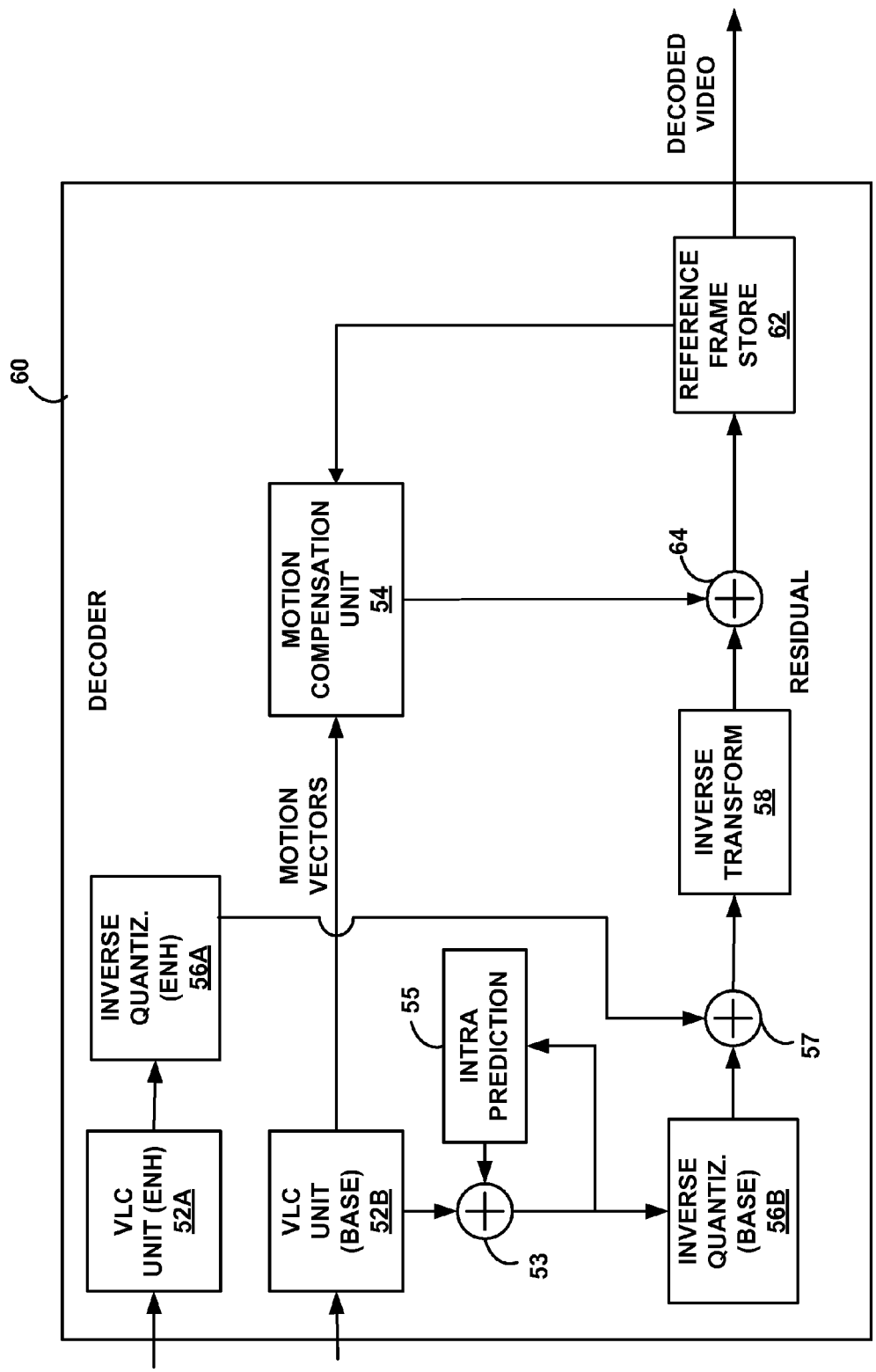
FIG. 4 is a block diagram illustrating an example of a video decoder consistent with this disclosure.

FIG. 4 is a block diagram illustrating an example of a video decoder 60, which may correspond to video decoder 18 of FIG. 1, or a decoder of another device. Video decoder 60 includes a VLC unit 52A for enhancement layer information, which performs the reciprocal function of VLC unit 46 of FIG. 3. That is to say, like VLC unit 46, VLC unit 52A codes the refinement coefficients of an enhancement layer.

Video decoder 60 may also include another VLC unit 52B for base layer information. Intra prediction unit 55 may optionally perform any spatial decoding of base layer video blocks, and the output of intra prediction unit 55 may be provided to adder 53. The enhancement layer path may include inverse quantization unit 58A, and the base layer path may include inverse quantization unit 56B. The information in the base layer and enhancement layer paths may be combined by adder 57.

Video decoder 60 may perform intra- and inter-decoding of blocks within video frames. In the example of FIG. 4, video decoder 60 includes VLC units 52A and 52B (mentioned above), motion compensation unit 54, inverse quantization units 56A and 56B, inverse transform unit 58, and reference frame store 62. Video decoder 60 also includes summer 64. Optionally, video decoder 60 also may include a deblocking filter (not shown) that filters the output of summer 64. Again, summer 57 combines information in the base layer and enhancement layer paths, and intra prediction unit 55 and adder 53 facilitate any spatial decoding of base layer video blocks.

In accordance with this disclosure, VLC unit 52A receives the encoded video bitstream and applies the VLC techniques described in this disclosure. In particular, for refinement coefficients, VLC unit 52A may select VLC tables for different video block types based on information gathered for previously coded frames. VLC unit 52A may select VLC tables once per coded unit, e.g., once per frame, once per slice of video information, once per FGS layer of a frame. The VLC tables for different types of video blocks can be selected based on statistics associated with previously coded blocks. For example, VLC unit 52A may select a VLC table for intra blocks based on statistics associated with previously coded intra blocks, and VLC unit 52A may select a VLC table for inter blocks based on statistics associated with previously coded inter blocks.

Following the decoding performed by VLC unit 52A, motion compensation unit 54 receives the motion vectors and one or more reconstructed reference frames from reference frame store 62. Inverse quantization unit 56A inverse quantizes, i.e., de-quantizes, the quantized block coefficients. Following combination of the enhancement and base layer information by adder 57, inverse transform unit 58 applies an inverse transform, e.g., an inverse DCT, to the coefficients to produce residual blocks. Motion compensation unit 54 produces motion compensated blocks that are summed by summer 64 with the residual blocks to form decoded blocks. If desired, a deblocking filter may also be applied to filter the decoded blocks in order to remove blockiness artifacts. The filtered blocks are then placed in reference frame store 62, which provides reference blocks from motion compensation and also produces decoded video to a drive display device (such as device 20 of FIG. 1).

Figure 5:
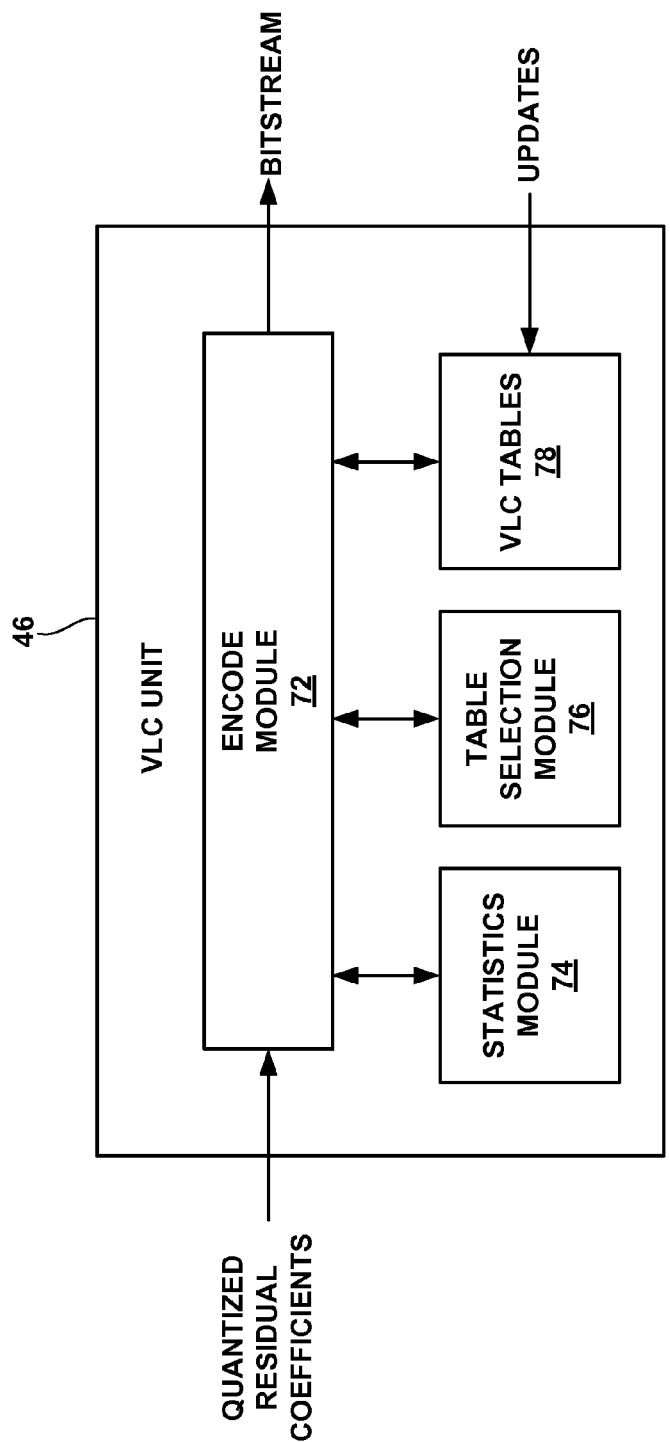
FIG. 5 is an exemplary block diagram of a variable length coding (VLC) encoding unit.

FIG. 5 is a block diagram illustrating an exemplary VLC unit 46, which may correspond to that shown in FIG. 3. VLC unit 46 includes an encode module 72, a statistics module 74, a table selection module 76, and VLC tables 78. VLC tables 78 generally refer to tables that may be stored in any location, e.g., locally or off-chip in a separate memory location. VLC tables 78 may be updated, periodically, as desired.

Encode module 72 encodes refinement coefficients and significant coefficients in separate coding passes. Table selection by VLC unit 46 for the encoding of coefficients associated with different video blocks may be performed based on information gathered for previously coded frames. For example, statistics module 74 may perform statistical analysis of previously encoded frames to facilitate table selection by table selection module 76.

Statistics module 74 determines first statistics associated with a first type of video block (such as an intra block), and determines second statistics associated with a second type of video block (such as an inter block). Table selection module 76 selects a first VLC table from a plurality of VLC tables 78 to be used in coding the first type of video block based on the first statistics. In addition, table selection module 76 selects a second VLC table from the plurality of VLC tables 78 to be used in coding the second type of video block based on the second statistics. Encode module 72 encodes video blocks of the first type based on the first VLC table, and encodes video blocks of the second type based on the second VLC table.

The techniques described herein may be performed with respect to refinement coefficients, which may be coded in a separate coding pass relative to the significant coefficients. Refinement coefficients may have values restricted to −1, 0 and 1, which may be coded by two bits of information. The first bit may indicate whether the coefficient is equal to 0 or not, and the second bit may indicate whether the sign (denoted as $s_n$) of the refinement coefficient same (coeff_ref_dir_flag=0) or different (coeff_ref_dir_flag=1) than the sign (denoted as $s_{n-1}$) of the corresponding coefficient of the previous layer. The previous layer is denoted as $s_{n-1}$. If the sign of current coefficient is the same as that of the previous layer, then coeff_ref_dir_flag=0, and if the sign of current coefficient is different than that of the previous layer then coeff_ref_dir_flag=1. The two refinement bits may be combined into an alphabet of three refinement symbols as follows in Table 1:

TABLE 1

| coeff_ref_flag | coeff_ref_dir_flag | ref_symbol |
|---|---|---|
| 0 | — | 0 |
| 1 | 0 | 1 |
| 1 | 1 | 2 |

Alternatively, another scheme could also be used to code the refinement coefficients without departing from the techniques of this disclosure.

VLC tables 78 may comprise variable length codewords that are mapped to different sets of coefficients, which may be defined by symbols, flags, or other types of bits. VLC tables 78 may be updated, as desired. Any number of tables may be included in VLC tables 88. In some cases, two tables are used, although more could be included. In any case, encode module 72 may access different ones of VLC tables for different types of video blocks. Statistics module 74 and table selection module 76 determine which VLC table should be used for each type of video block being coded.

Table 2 provides one example of a VLC table that could be used for coding refinement coefficients.

TABLE 2

| Group of ref symbol | Code length | Codeword |
|---|---|---|
| {0, 0, 0} | 1 | 1 |
| {0, 0, 1} | 4 | 0011 |
| {0, 0, 2} | 5 | 00101 |
| {0, 1, 0} | 3 | 011 |
| {0, 1, 1} | 6 | 000101 |
| {0, 1, 2} | 8 | 00000101 |
| {0, 2, 0} | 5 | 00100 |
| {0, 2, 1} | 7 | 0000101 |
| {0, 2, 2} | 9 | 000000101 |
| {1, 0, 0} | 3 | 010 |
| {1, 0, 1} | 6 | 000100 |
| {1, 0, 2} | 8 | 00000100 |
| {1, 1, 0} | 6 | 000011 |
| {1, 1, 1} | 9 | 000000100 |
| {1, 1, 2} | 10 | 0000000011 |
| {1, 2, 0} | 7 | 0000100 |
| {1, 2, 1} | 10 | 0000000010 |
| {1, 2, 2} | 12 | 000000000011 |
| {2, 0, 0} | 5 | 00011 |
| {2, 0, 1} | 7 | 0000011 |
| {2, 0, 2} | 9 | 000000011 |
| {2, 1, 0} | 8 | 00000011 |
| {2, 1, 1} | 10 | 0000000001 |
| {2, 1, 2} | 12 | 000000000010 |
| {2, 2, 0} | 9 | 000000010 |
| {2, 2, 1} | 12 | 000000000001 |
| {2, 2, 2} | 12 | 000000000000 |

As shown in Table 2, different sets of refinement coefficients (as defined in Table 1) may be mapped to the different variable length codewords. Table 2 also lists the respective bit lengths associated with different codewords. The codeword mappings to different sets of refinement coefficients may differ in different VLC tables. Accordingly, by selecting the appropriate table, coding efficiency may be achieved. According to this disclosure, for each coded unit (e.g., each frame, slice or FGS layer), table selection module 76 of VLC unit 46 selects a first VLC table for intra blocks and selects a second VLC table for inter blocks. The table selection may be based on statistics associated with previously coded intra blocks and previously coded inter blocks. Encode module 72 of VLC unit 46 then uses the selected tables in the VLC process.

The statistics for each type of video block may be accumulated and analyzed by statistic module 74. As an example, the statistics for each type of video block may comprise a ratio of the number of refinement coefficients in previously coded blocks that had a same sign value relative to the number of refinement coefficients in previously coded blocks that had an inverted sign value. Based on this ratio for each type of video block, table selection module 76 may select a VLC table for coding the refinement coefficients associated with that type of block of a given frame. When the next frame (or other coded unit) is encounter, VLC unit 46 may re-calculate the ratios for each block type to facilitate VLC table selections for that frame (or other coded unit).

Refinement symbol 1 from Table 1 corresponds to the scenario where the refinement symbol has a same sign value relative to the symbol in the previous layer (or base layer). Refinement symbol 2 from Table 1 corresponds to the scenario where the refinement symbol has an inverted sign value relative to the symbol in the previous layer (or base layer). In other words, symbol 1 means "keep the same sign" and symbol 2 means "invert the sign" relative to the sign of the corresponding coefficient in the previous layer.

Coding efficiency in SVC may be improved when VLC table selection is based on the ratio of ref symbols 1 and 2. Let s(1) and s(2) respectively denote the number of refinement symbols 1 and 2 collected in the coding process. The values for s(1) and s(2) could be defined by sliding windows of frames, or could accumulate over a full video sequence. In any case, a ratio r can be calculated in number of ways. For example, a ratio $r=(s_{max}-s_{min})/s_{max}$, may be calculated, where $s_{max}=\max(s(1),s(2))$ and $s_{min}=\min(s(1),s(2))$. Alternatively, a ratio $r=s(1)/(s(1)+s(2))$ could be used. In each of these cases, for each quantized value of r, a value $R_Q$ may be defined as being equal to floor(m*r), where m is some number larger than 1. Different VLC tables may be assigned depending on whether ratio r is above or below the value $R_Q$.

Figure 6:
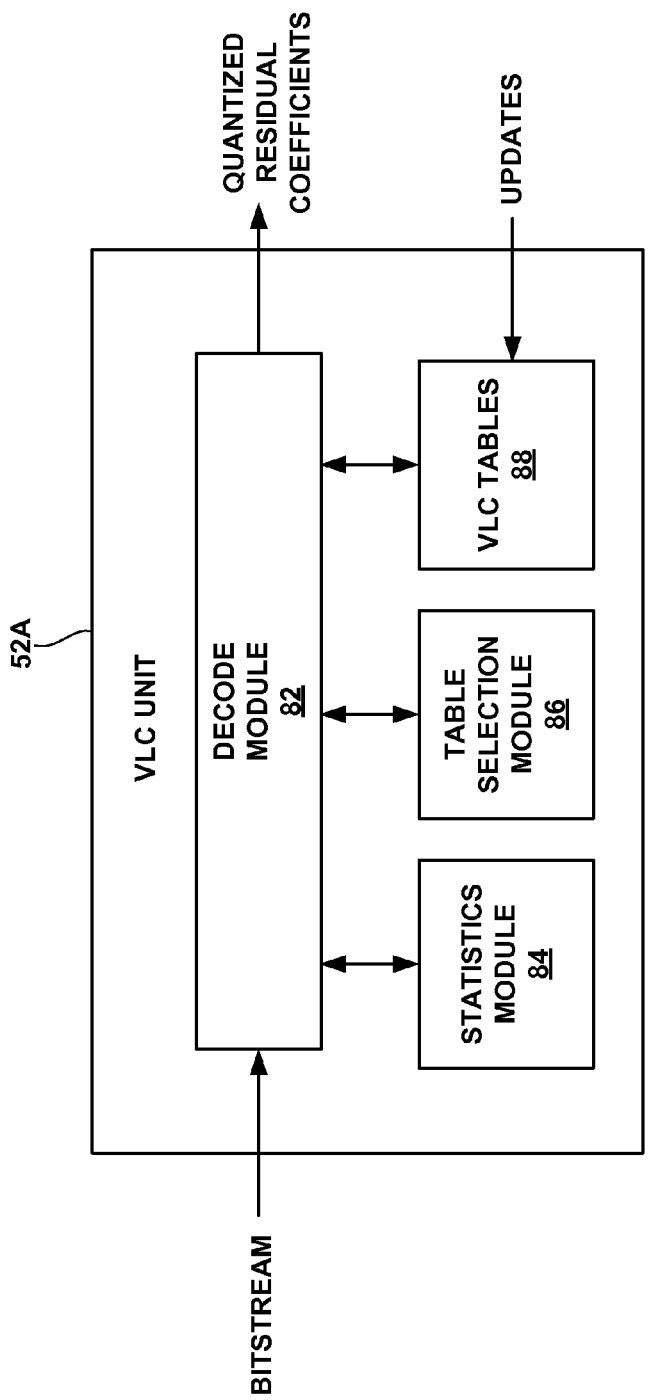
FIG. 6 is an exemplary block diagram of a VLC decoding unit.

FIG. 6 is a block diagram illustrating an exemplary VLC unit 52A, which may correspond to that shown in FIG. 4. VLC unit 52A performs reciprocal decoding functions relative to the encoding that is performed by VLC unit 46. Thus, whereas VLC unit 46 receives quantized residual coefficients and generates a bitstream, VLC unit 52A receives a bitstream and generates quantized residual coefficients. VLC unit 52A includes a decode module 82, a statistics module 84, a table selection module 86, and a set of VLC tables 88. Like in unit 46, VLC tables 88 of unit 52A generally refer to tables that may be stored in any location, e.g., locally or off-chip in a separate memory location. VLC tables 88 may be updated, periodically, as desired. Any number of tables may be included in VLC tables 88. In some cases two tables are used, although more could be included.

VLC decode unit 82 may perform separate decoding passes for significant coefficients and refinement coefficients. The techniques of this disclosure may be applicable to the coding or refinement coefficients only, or could be used for both refinement and significant coefficients. The decoding performed by VLC unit 52A is reciprocal to the encoding performed by VLC unit 46.

Table selection by VLC unit 52A for the decoding of coefficients associated with different video blocks may be performed based on information gathered for previously coded blocks, e.g., from previously coded frames. For example, statistics module 84 may perform statistical analysis of the blocks of previously decoded frames to facilitate table selection by table selection module 86. In particular, statistics module 84 determines first statistics associated with a first type of video block (such as an intra block), and determines second statistics associated with a second type of video block (such as an inter block). Table selection module 86 selects a first VLC table from a plurality of VLC tables 88 to be used in coding the first type of video block based on the first statistics. In addition, table selection module 86 selects a second VLC table from the plurality of VLC tables 88 to be used in coding the second type of video block based on the second statistics. Decode module 82 decodes video blocks of the first type based on the first VLC table and decodes video blocks of the second type based on the second VLC table.

Table 2 above can also be viewed as one of VLC tables 88. However, whereas VLC tables 78 (FIG. 5) map sets of coefficients to variable length codewords, VLC tables 88 (FIG. 6) map the variable length codewords back to sets of coefficients. In this way, the decoding performed by VLC unit 52A can be viewed as being reciprocal to the encoding performed by VLC unit 46.

Figure 7:
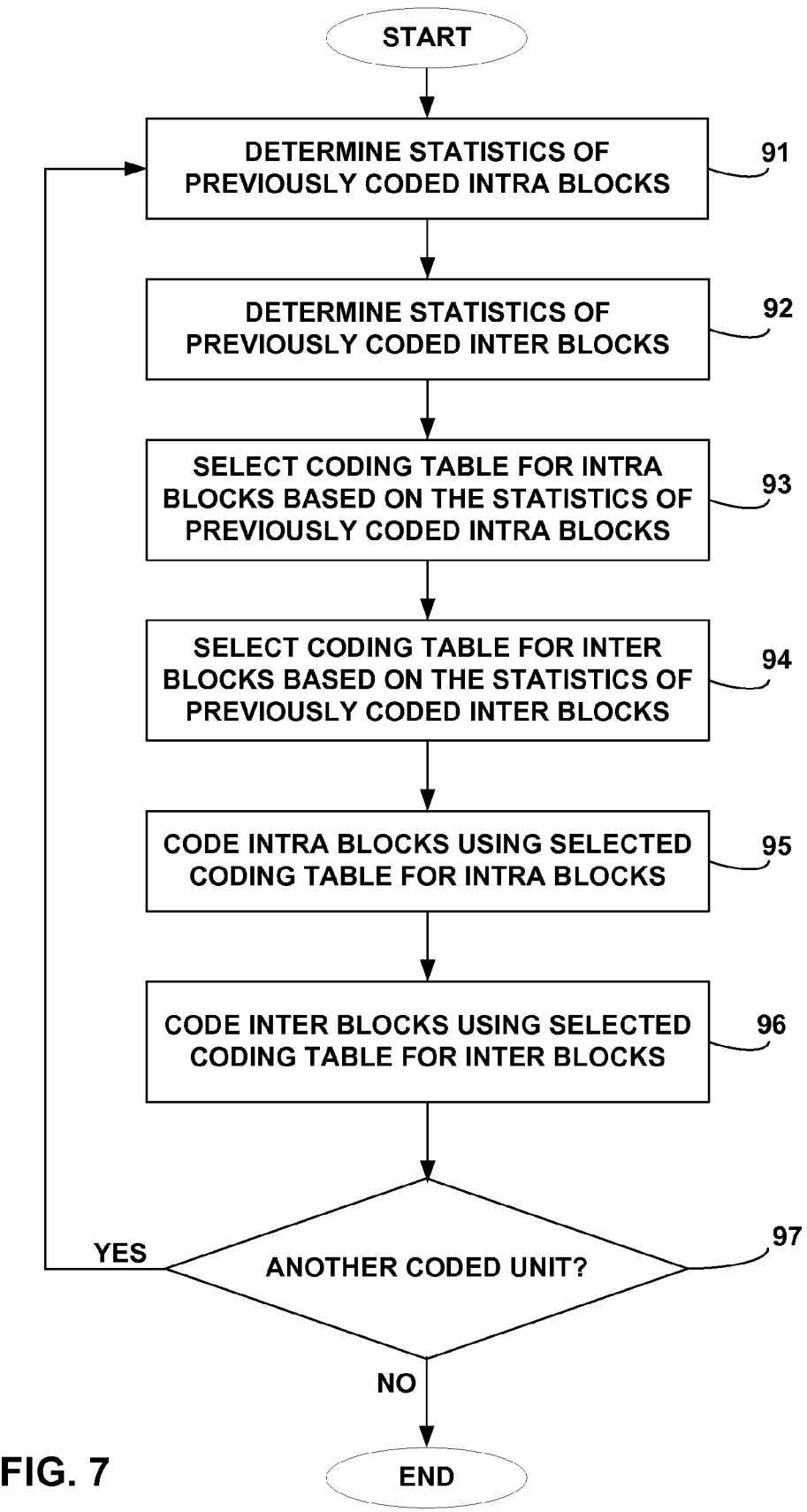
FIG. 7 is a flow diagram illustrating a VLC technique for variable length coding consistent with this disclosure.

FIG. 7 is a flow diagram illustrating a coding technique for variable length coding of coefficients (e.g., typically refinement coefficients) of an enhancement layer consistent with this disclosure. The coding process of FIG. 7 applies to both encoding and decoding. As shown in FIG. 7, a statistics module 74, 84 determines statistics of previously coded intra blocks (91). For example, statistics module 74, 84 may calculate for previously coded intra blocks, a ratio of refinement symbols having a same sign value relative to refinement symbols having an inverted sign value. In addition, statistics module 74, 84 may determine statistics of previously coded inter blocks (92), e.g., by calculating for previously coded inter blocks, a ratio of refinement symbols having a same sign value relative refinement symbols having an inverted sign value.

Table selection module 76, 86 selects a coding table for intra blocks based on the statistics of previously coded intra blocks (93). The coding table for intra blocks, for example, may be selected based on the value of the ratio associated with intra blocks. In addition, table selection module 76, 86 selects a coding table for inter blocks based on the statistics of previously coded inter blocks (94). The coding table for inter blocks may be selected based on the value of the ratio associated with inter blocks.

Coding module 82, 84 codes intra blocks using the selected coding table for intra blocks (95), and codes inter blocks using the selected coding table for inter blocks (96). In particular, coding module 82, 84 performs table lookups using the selected coding tables for the different block types. The process may repeat for every coded unit (97). Coded units may be video frames, slices of video frames, FGS layers, or the like.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

If implemented in hardware, this disclosure may be directed to a circuit, such as an integrated circuit, chipset application specific integrated circuit (ASIC), field programmable gate array (FPGA), logic, or various combinations thereof configured to perform one or more of the techniques described herein Various embodiments of the invention have been described. These and other embodiments are within the scope of the following claims.

The invention claimed is:

1. A method of coding an enhancement layer of a scalable video coding (SVC) scheme, the method comprising:
   determining a first ratio associated with a first type of video block;
   determining a second ratio associated with a second type of video block, wherein the first and second ratios are based on symbols indicating whether signs of refinement coefficients have changed or stayed the same relative to corresponding coefficients of a previous layer in the SVC scheme;
   selecting a first variable length coding (VLC) table from a plurality of VLC tables to be used in coding the first type of video block based on the first ratio;
   selecting a second VLC table from the plurality of VLC tables to be used in coding the second type of video block based on the second ratio;
   coding video blocks of the first type based on the first VLC table; and
   coding video blocks of the second type based on the second VLC table.

2. The method of claim 1, wherein:
   coding video blocks of the first type based on the first VLC table comprises encoding video blocks of the first type based on the first VLC table; and
   coding video blocks of the second type based on the second VLC table comprises encoding video blocks of the second type based on the second VLC table.

3. The method of claim 1, wherein:
   coding video blocks of the first type based on the first VLC table comprises decoding video blocks of the first type based on the first VLC table; and
   coding video blocks of the second type based on the second VLC table comprises decoding video blocks of the second type based on the second VLC table.

4. The method of claim 1, wherein:
   coding video blocks of the first type based on the first VLC table comprises performing table lookups using the first VLC table; and
   coding video blocks of the second type based on the second VLC table comprises performing table lookups using the second VLC table.

5. The method of claim 1, wherein the first type of the video block comprises an intra-coded video block and the second type of the video block comprises an inter-coded video block.

6. The method of claim 1, wherein the video blocks are arranged in frames, wherein the method is repeated for each of the frames.

7. The method of claim 1, wherein the method is performed with respect to refinement coefficients of the enhancement layer, wherein:
   coding video blocks of the first type based on the first VLC table comprises coding refinement coefficients associated with video blocks of the first type; and
   coding video blocks of the second type based on the second VLC table comprises coding refinement coefficients associated with video blocks of the second type.

8. The method of claim 7, wherein:
   the first and second ratios are ratios of symbols indicating whether previously coded refinement coefficients have a same sign value or an inverted sign value relative to the corresponding coefficients of the previous layer in the SVC scheme.

9. A non-transitory computer-readable medium comprising instructions that upon execution in a video coding device cause the device to code an enhancement layer of a scalable video coding (SVC) scheme, wherein the instructions cause the device to:
   determine a first ratio associated with a first type of video block;
   determine a second ratio associated with a second type of video block, wherein the first and second ratios are based on symbols indicating whether signs of refinement coefficients have changed or stayed the same relative to corresponding coefficients of a previous layer in the SVC scheme;
   select a first variable length coding (VLC) table from a plurality of VLC tables to be used in coding the first type of video block based on the first ratio;
   select a second VLC table from the plurality of VLC tables to be used in coding the second type of video block based on the second ratio;
   code video blocks of the first type based on the first VLC table; and
   code video blocks of the second type based on the second VLC table.

10. The non-transitory computer-readable medium of claim 9, wherein:
    the instructions that cause the video coding device to code video blocks of the first type based on the first VLC table cause the video coding device to encode video blocks of the first type based on the first VLC table; and
    the instructions that cause the video coding device to code video blocks of the second type based on the second VLC table cause the video coding device to encode video blocks of the second type based on the second VLC table.

11. The non-transitory computer-readable medium of claim 9, wherein:
    the instructions that cause the video coding device to code video blocks of the first type based on the first VLC table comprise instructions that cause the video coding device to decode video blocks of the first type based on the first VLC table; and
    the instructions that cause the video coding device to code video blocks of the second type based on the second VLC table cause the video coding device to decode video blocks of the second type based on the second VLC table.

12. The non-transitory computer-readable medium of claim 9, wherein:
    the instructions that cause the video coding device to code video blocks of the first type based on the first VLC table cause the video coding device to perform table lookups using the first VLC table; and
    the instructions that cause the video coding device to code video blocks of the second type based on the second VLC table cause the video coding device to perform table lookups using the second VLC table.

13. The non-transitory computer-readable medium of claim 9, wherein the first type of the video block comprises an intra-coded video block and the second type of the video block comprises an inter-coded video block.

14. The non-transitory computer-readable medium of claim 9, wherein the video blocks are arranged in frames, and wherein the instructions are repeated for each of the frames.

15. The non-transitory computer-readable medium of claim 9, wherein the instructions are performed with respect to refinement coefficients of the enhancement layer, wherein:
- the instructions that cause the video coding device to code video blocks of the first type based on the first VLC table comprise the instructions that cause the video coding device to code refinement coefficients associated with video blocks of the first type; and
- the instructions that cause the video coding device to code video blocks of the second type based on the second VLC table comprise the instructions that cause the video coding device to code refinement coefficients associated with video blocks of the second type.

16. The non-transitory computer-readable medium of claim 15, wherein: the first and second ratios are ratios of symbols indicating whether previously coded refinement coefficients have a same sign value or an inverted sign value relative to the corresponding coefficients of the previous layer in the SVC scheme.

\* \* \* \* \*